United States Patent
Carley et al.

(10) Patent No.: US 8,508,148 B1
(45) Date of Patent: Aug. 13, 2013

(54) SYSTEM FOR LIGHT AND APPLIANCE REMOTE CONTROL

(75) Inventors: Adam L Carley, Windham, NH (US); Anthony D D'Amelio, Andover, MA (US); James Edward Mandry, N. Andover, MA (US); Daniel J Allen, Derry, NH (US)

(73) Assignee: MagicLux, LLC, Hudson, NH (US)

( * ) Notice: Subject to any disclaimer, the term of this patent is extended or adjusted under 35 U.S.C. 154(b) by 133 days.

(21) Appl. No.: 12/694,733

(22) Filed: Jan. 27, 2010

Related U.S. Application Data

(60) Provisional application No. 61/148,994, filed on Feb. 1, 2009.

(51) Int. Cl.
| | |
|---|---|
| *H05B 37/02* | (2006.01) |
| *H05B 39/04* | (2006.01) |
| *H05B 41/36* | (2006.01) |
| *H01R 13/66* | (2006.01) |
| *H01R 24/00* | (2006.01) |

(52) U.S. Cl.
USPC .............. 315/291; 200/51.02; 439/620.02

(58) Field of Classification Search
USPC ................ 439/620.02; 200/51.02, 51.04
See application file for complete search history.

(56) References Cited

U.S. PATENT DOCUMENTS

| | | |
|---|---|---|
| 1,605,800 A | 11/1926 | Vogt |
| 1,854,842 A | 4/1932 | Huppert |
| 2,037,653 A | 4/1936 | Fow |
| 2,177,806 A | 10/1939 | Kamm |
| 2,218,173 A | 10/1940 | Kulka |
| 2,222,655 A | 11/1940 | Dulberg |
| 2,244,044 A | 6/1941 | Bishop |
| 2,546,554 A | 3/1951 | McElroy |
| 3,028,523 A | 4/1962 | Seid |

(Continued)

FOREIGN PATENT DOCUMENTS

| | | | |
|---|---|---|---|
| WO | WO 0057678 | * | 9/2000 |

OTHER PUBLICATIONS

Super Switch Wireless Remote Control.Datasheet[online]eForCity, 2008[Retrieved on Jul. 30, 2011].Retrieved from eForCity using Internet<URL: http://www.eforcity.com/dothxxrcad02.html?int=efsechtxtrigos-item>.*

(Continued)

*Primary Examiner* — Douglas W Owens
*Assistant Examiner* — Dedei K Hammond
(74) *Attorney, Agent, or Firm* — Edell, Shapiro & Finnan, LLC

(57) ABSTRACT

A system for remote control of lights and small appliances utilizing miniature remote control units, and a method for easily and simply setting which remote controls control which item(s). Unlike conventional remote controls which are moved from place to place, these miniature remote controls are so small they may be removably mounted at each location needed, unobtrusively or even hidden. Receivers for the remote signal are described manufactured within a lamp socket assembly, a very short light bulb socket adapter, the light bulb itself, a wallswitch dimmer and an outlet adapter. One remote control can control multiple receivers, or vice versa, or any other combination, without conflict and with the combination set up or changed more intuitively than in completing systems. Appliances may be turned on or off and lights may be dimmed precisely or set flashing in unison to summon help.

41 Claims, 12 Drawing Sheets

(56) References Cited

U.S. PATENT DOCUMENTS

| | | | |
|---|---|---|---|
| 3,070,767 | A | 12/1962 | Rabinow |
| 3,248,534 | A | 4/1966 | Cahill et al. |
| 3,392,293 | A | 7/1968 | DeBoo et al. |
| 3,420,552 | A | 1/1969 | Mork |
| 3,433,967 | A | 3/1969 | Bernheim |
| 3,452,215 | A | 6/1969 | Alessio |
| 3,496,451 | A | 2/1970 | Duncan |
| 3,517,259 | A | 6/1970 | Dotto |
| 3,543,088 | A | 11/1970 | Garrett |
| 3,781,593 | A | 12/1973 | Rodriguez |
| 3,893,019 | A | 7/1975 | King et al. |
| 4,023,035 | A | 5/1977 | Rodriguez |
| 4,754,255 | A * | 6/1988 | Sanders et al. ............ 307/10.4 |
| 5,068,576 | A | 11/1991 | Hu et al. |
| 5,121,287 | A | 6/1992 | Lee |
| 5,463,286 | A * | 10/1995 | D'Aleo et al. ............ 315/295 |
| 5,731,663 | A | 3/1998 | Davis |
| 5,744,913 | A | 4/1998 | Martich et al. |
| 6,188,810 | B1 | 2/2001 | Baney |
| 6,218,787 | B1 | 4/2001 | Murcko et al. |
| 6,340,864 | B1 | 1/2002 | Wacyk |
| 6,650,029 | B1 * | 11/2003 | Johnston ................ 307/125 |
| 6,727,665 | B2 | 4/2004 | Yao |
| 6,828,733 | B1 | 12/2004 | Crenshaw |
| 6,906,477 | B2 | 6/2005 | Kazanov et al. |
| 7,106,261 | B2 | 9/2006 | Nagel et al. |
| 7,248,144 | B2 * | 7/2007 | Rodriguez ................ 340/5.71 |
| 7,556,398 | B2 | 7/2009 | Van Der Poel |
| 7,597,452 | B2 | 10/2009 | Jeng et al. |
| 7,633,230 | B2 | 12/2009 | Ribarich |
| 7,659,674 | B2 | 2/2010 | Mueller et al. |
| 2003/0016119 | A1 * | 1/2003 | Teich ...................... 340/5.22 |
| 2005/0155942 | A1 * | 7/2005 | Viola ....................... 211/26.1 |
| 2005/0231134 | A1 * | 10/2005 | Sid .......................... 315/294 |
| 2005/0236998 | A1 * | 10/2005 | Mueller et al. ............. 315/51 |
| 2007/0176766 | A1 * | 8/2007 | Cheng ...................... 340/527 |
| 2007/0188103 | A1 | 8/2007 | Ribarich |
| 2008/0111491 | A1 * | 5/2008 | Spira ....................... 315/158 |
| 2008/0316047 | A1 * | 12/2008 | De Goederen-Oei et al. ..................... 340/825.72 |
| 2009/0059603 | A1 * | 3/2009 | Recker et al. .............. 362/362 |
| 2009/0256489 | A1 | 10/2009 | Morales et al. |

OTHER PUBLICATIONS

Super Switch.Datasheet[online]firstStreet,2009[Retrieved on Jul. 30, 2011].Retrieved from firstStreet using Internet<URL: http://www.firststreetonline.com/Electronics+amp+Gadgets/Gadgets/Super+Switch+Pro.axd>.*

Lutron Maestro Wireless RF Digital Fade Dimmers—product brochure, product information for product that was available prior to Feb. 1, 2009.

Convert-A-bulb, product information for product that was available prior to Feb. 1, 2009.

Medium Base to Medium Base Porcelain Socket Extender, product information for product that was available prior to Feb. 1, 2009.

3093A New Ford Remote Head Key with 12 month warranty, product information for product that was available prior to Feb. 1, 2009.

TCP Plastic Mold Medium to Medium CFL Socket Extender, product information for product that was available prior to Feb. 1, 2009.

SuperSwitch, product information for product that was available prior to Feb. 1, 2009.

Screw-In Universal Touch Full Range Dimmer, product information for product that was available prior to Feb. 1, 2009.

X10 Socketrocket Compact Screw-In Lamp Module, product information for product that was available prior to Feb. 1, 2009.

PHW04D Slim RF Wall Transmitter Remote Control, product information for product that was available prior to Feb. 1, 2009.

ZigBee Home Automation Certified Products, product information for product that was available prior to Feb. 1, 2009.

Aurex—Wireless Lighting Dimmer Switch, product information for product that was available prior to Feb. 1, 2009.

Bye Bye Standby Wall Dimmer Switch, product information for product that was available prior to Feb. 1, 2009.

Carlon Wireless Light Socket Switch, product information for product that was available prior to Feb. 1, 2009.

Lutron Maestro Wireless Controller, product information for product that was available prior to Feb. 1, 2009.

Lutron Maestro Wireless Dimmer, product information for product that was available prior to Feb. 1, 2009.

HandySwitch—The Wireless light switch, product information for product that was available prior to Feb. 1, 2009.

Button Flasher, product information for product that was available prior to Feb. 1, 2009.

Intermediate Base Socket Reduced to Candelabra Base Socket, product information for product that was available prior to Feb. 1, 2009.

Leviton Brand, Fat Boy Socket w/ Full Range Dimmer, product information for product that was available prior to Feb. 1, 2009.

Lutron Maestro Wireless, Wireless Control with Preset Button, Installation Instructions, product information for product that was available prior to Feb. 1, 2009.

Lutron Stanza Lamp Socket Dimmer/Switch, Wireless Lighting Control, Product Description and Installation Notes, product information for product that was available prior to Feb. 1, 2009.

Office Action in co-pending U.S. Appl. No. 12/694,685, mailed May 1, 2012.

* cited by examiner

1

SYSTEM FOR LIGHT AND APPLIANCE REMOTE CONTROL

CROSS-REFERENCE TO RELATED APPLICATIONS

This application claims the benefit of U.S. Provisional Patent Application No. 61/148,994, filed Feb. 1, 2009, the entirety of which is incorporated herein by reference.

This application is also related to U.S. Patent Application filed on even date and entitled "Shortened Adapter For Light Bulb Sockets With Miniature Remote Controller," U.S. application Ser. No. 12/694,685 the entirety of which is incorporated herein by reference.

TECHNICAL FIELD

This disclosure relates to remote control of lights and appliances by radio frequency (RF) techniques and systems for them comprising many remote controls controlling many items without interference.

BACKGROUND

There are five billion light bulb sockets in the United States. This market has fostered numerous devices and schemes to control lights.

The most common controls are wall switches near entrances to rooms. This location is adequate for on-off switches because one normally uses them entering or leaving the room. The room entrance wall switch location is not always adequate for dimmer switches because the need to change light level usually arises when inside the room, often while sitting or lying down, and not when entering and leaving the room. Hence the concept of a remote control has arisen, analogous to a television remote control or a wall switch on a nightstand. Some remote control devices are little more than novelties, controlling a single device at a fixed frequency and easily interfered with by a second remote control nearby. At the other extreme are elaborate and quite expensive "home automation" systems with remote controls having dozens of buttons and often a small screen for user interface. For example, the remote control allows a user to configure the home automation system to turn on a coffee pot the next morning. A lesser expensive and elaborate system is the remote control sold by Lutron®. This is a single remote controller configured to control a single wallswitch. It has five buttons for ON, OFF, brighter, dimmer, and a preset light level. It is infra-red based and, for added convenience (and/or confusion), it is compatible with some other infra-red remote control systems. The remote control is large enough to fit in the hand of a user, but small enough to be easily misplaced. If the user forgets to take it with him/her, it can end up in some other location where it is no more convenient than the wallswitch it is supposed to replace.

SUMMARY

The system disclosed here focuses on simplicity without sacrificing utility. The user can build as elementary or as extensive and interconnected a system as he/she likes without learning a single code or consulting any manual.

The system is based on a miniature remote controller that is only a little bigger than a postage stamp. In one embodiment, the miniature remote controller has just two buttons. One button points UP and the other points DOWN, which is exactly representative of the functions they invoke on a light or appliance being controlled. Designed to be inexpensive, disposable, and interchangeable, a special miniature mounting system allows them to be securely mounted on almost object and later removed without damage. Most importantly, several miniature remote control devices can be installed in a room, one at a time, until users have access to one at every desired location in the room. Various types of receivers compatible with the miniature remote controls complete the system and can be purchased and put it use, again, one at a time. There is no central station. Five types of receivers are described herein. They are not intended to be limiting and the embodiments presented for each are representative only. The five types are:

(a) A very short light socket adapter that is screwed in between a light bulb and its socket. An example of such an adapter is disclosed in the aforementioned co-pending application.

(b) A light bulb of the Compact Fluorescent Lamp (CFL) or Light Emitting Diode (LED) type with a compatible receiver already inside it.

(c) A lamp socket assembly either manufactured with or retrofitted to a lamp.

(d) An outlet adapter plugged in the wall between an appliance plug and the wall outlet.

(e) A permanently installed wallswitch light dimmer or fan control installed instead of or to replace a conventional wallswitch dimmer or fan control.

The miniature controllers and the receivers each have pre-programmed micro-processors with stored codes and sophisticated algorithms for error and conflict avoidance and correction and for inferring the user's intentions. Complication on the inside begets simplicity on the outside to a user as will be apparent from the following.

BRIEF DESCRIPTION OF THE DRAWINGS

The invention will be described in further detail with references to the accompanying drawings, in which.

DETAILED DESCRIPTION

The following terms are used in the following descriptions and their meanings are designated as follows. "Light bulb adapter" herein refers to a device that is inserted into a light bulb socket and into which a light bulb is inserted in turn. "Outlet adapter" refers to a device plugged into an electrical outlet and into which an appliance is plugged in turn. "Wallswitch dimmer" refers control devices typically mounted near doorways to control one or more light fixtures. They may comprise toggle switches, rocker switches, slider switches, or rotary switches.

The term "shortened adapter" refers to a light bulb adapter that provides a shortened bulb displacement. Bulb displacement is the amount the bottom electrical contact of a light bulb is raised above the bottom electrical contact of the light bulb socket by the adapter.

"Light bulb" includes but is not limited to an incandescent light bulb, a non-dimmable or dimmable compact fluorescent light (CFL), and a non-dimmable or dimmable light emitting diode (LED) bulb.

The term "electronic components" refers to active, passive, or sensor components mounted on a printed circuit board or otherwise. This term also includes antennas and mechanical switches. The term "electronic subsystem" refers to a group of electronic components that perform an electronic function, and may include one or more printed circuit boards or a flex strip with various electronic components soldered or otherwise attached to them. "Electronic subsystems" may include parts that are geometrically separated but electrically connected and function together.

"Transmitter" may refer to the chip or other circuit, e.g., circuit 208 described herein, directly generating the radio frequency signal, that chip plus supporting components, or to the entire miniature remote controller 100, described herein, depending on context. "Receiver" may refer to the chip or other circuit, e.g., circuit 166 described herein, directly detecting the radio frequency signal, that chip plus supporting components, or to the entire adapter 1, referred to herein, depending on context.

Miniature Remote Controller

Figure 1:
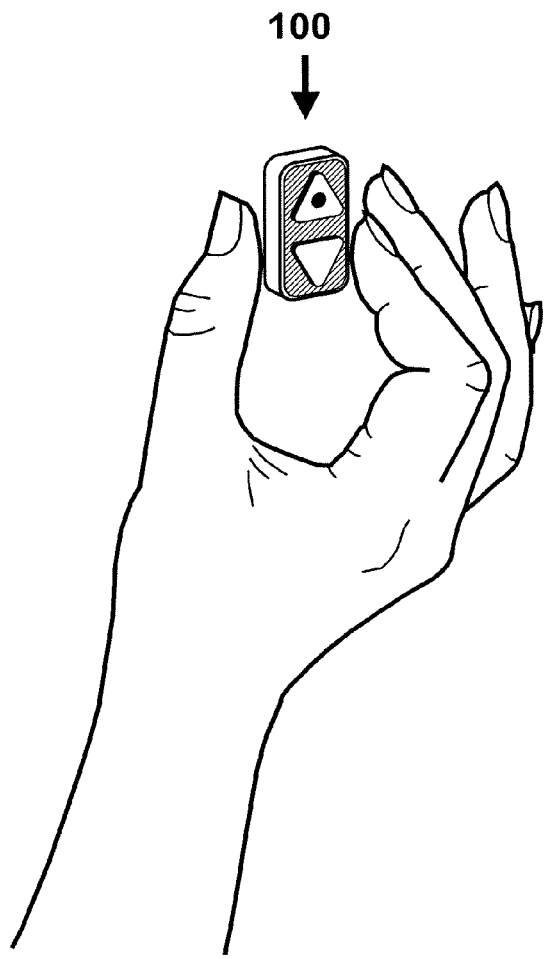
FIG. 1 shows a hand holding the miniature remote controller.

FIG. 1 depicts a user's hand holding a miniature remote controller 100 according to embodiments described herein. The diagram of FIG. 1 includes a user's hand to indicate its shape and very small size. It is so small and compact that it would be awkward to use in one's hand. By design it discourages hand-held use, and further discourages frequently moving it from one place to another where it could be easily misplaced. Thus, it is very much unlike a handheld remote controller, where a single unit is intended to be moved among multiple points of use. Another purpose of this design is to have it sufficiently small that it is visually and physically unobtrusive when mounted on a larger object. Alternatively, it may be completely hidden, e.g. on the underside of a table or chair or other object.

In addition to its small size, its light weight makes it easy to mount on larger objects wherever control is desired. Such a larger object can be fixed, such as a wall or railing, or a piece of furniture where it can be mounted in an unobtrusive location, e.g. under the edge of a table or under the arm of a chair. Such a larger object can be movable, such as a clipboard, television remote controller, or crutches. Thus, unlike a stick-on wireless wall switch, the controller is intended and configured for unobtrusive or concealed locations, or locations where it does not interfere with the use of an object such as clipboard, television remote controller, or crutches. Also, clutter on a table can be reduced by mounting the miniature remote controller beneath the edge of a table. Further, some people consider larger controllers to be unsightly and prefer them to be concealed, which is facilitated by the miniature remote controller 100.

If desired, the controller can be repositioned, such as to a different piece of furniture or another place on the same piece of furniture. The miniature remote controller may be removably mounted to the larger object by various means such as double-sided adhesive pads, magnets, suction cups, a tiny screw, adhesive Velcro© tape, snap fasteners with one part of the snap fastener attached to the miniature remote controller and the other part removably attached to the larger object, or adhesive putty. In one embodiment, 3M brand Command® adhesive strips are used. This product is a single-use pressure-sensitive adhesive pad incorporating a special tab mechanism for easy removal without damage or residue to the surface. This product may be used in combination with other attachment means such as Velcro© tape or magnets, and may incorporate a part between the miniature remote controller and the larger object.

The miniature remote controller 100 transmits a radio frequency signal to control a device, but could, in another embodiment, emit an optical signal. In one embodiment, the miniature remote controller 100 controls a light bulb by means of the light bulb adapter of FIG. 5 which includes an antenna 2 to receive the signal. However, receivers for the miniature remote controller's signal are not limited to adapter devices, as discussed in connection with FIGS. 5 and 6 below.

Figure 2:
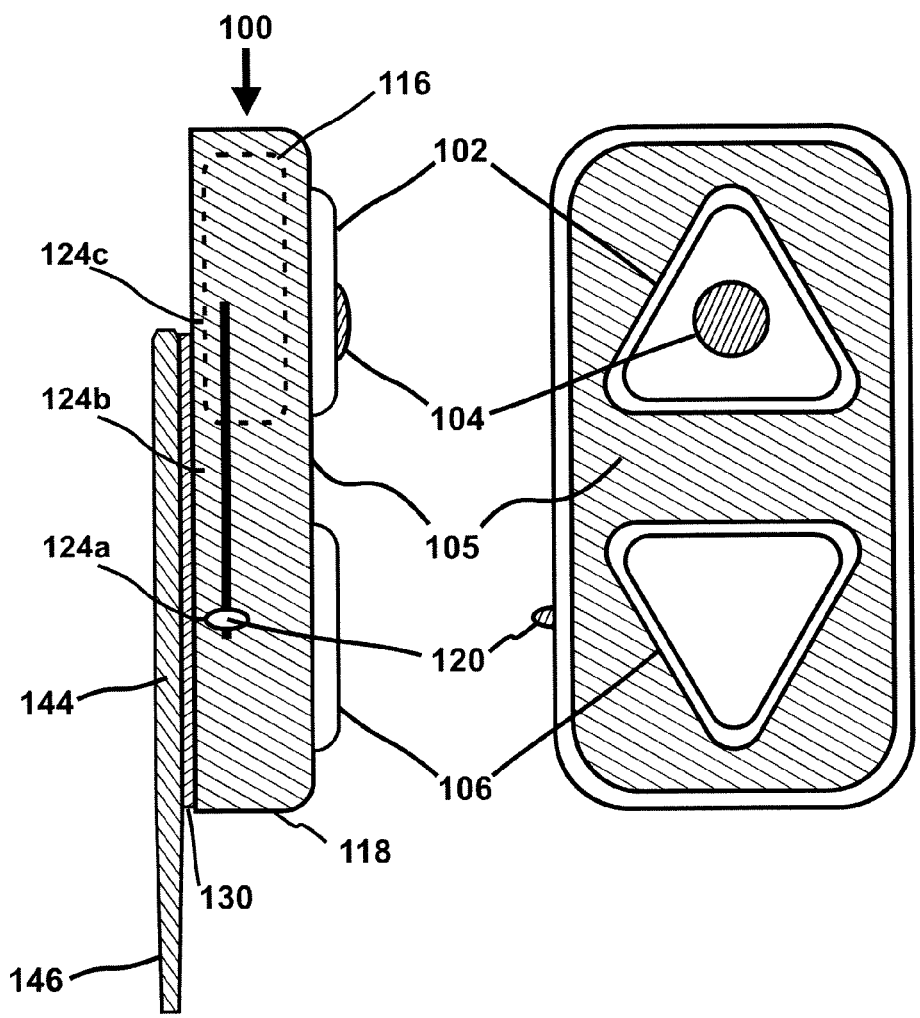
FIG. 2 shows views of the miniature remote controller.

FIG. 2 depicts the miniature remote controller according to one embodiment. It comprises a housing or body 118. The top surface 105 of the body comprises a top button 104 and a bottom button 106 disposed thereon. The top button has a dimple or a bump or other distinctive feature such as a color to distinguish it both visually and by touch from the bottom button. FIG. 2 shows an example where buttons 102 and 106 have a triangular shape, and where the top button is a right-side up triangle and the bottom button is an inverted triangle indicating "up" (brighter) and "down" (dimmer) respectively. This is meant by way of example, and not to be limiting. The buttons could be square or round, for example. However, the triangular button shape, the opposite arrangement of just two buttons, and the marking on one button make the controller very user-friendly, are in deliberate contrast with conventional remote controllers having many buttons and even a display. A miniature rocker switch may also be used instead of two buttons.

The housing or body 118 and consequently the top surface 105 are sized to support a minimal amount of buttons, for example, at least one button, but no more than two buttons, e.g., buttons 102 and 106. Furthermore, the buttons 102 and 106 are sized to be actuated by a user's finger tip of average size, and no larger. The shape of the housing body 108 is shown in the figures to be rectangular, but that is only an example. It could have an oval shape, circular shape, etc. While the housing 118 can be held in a user's hand, its size and shape is configured so that it is not used when held in a user's hand, but rather only for use when it is mounted to a larger object. The buttons 102 and 106 are one example of finger actuation means. Thus, the miniature remote controller 100 is configured to be a mountable remote controller, not for hand-held use, and of such a small size that when it is mounted on a larger object, it is not visually distracting or obvious.

FIG. 2 depicts one embodiment of a miniature remote controller 100 configured to act as three independent remote controllers which could, for example, control three receivers, such as those described herein. The controller 100 incorporates a battery 116 within its housing 118 to provide power for processing and transmission of signals. In one embodiment, battery 116 is absent and power is derived from the force of the user's finger on a button or other finger-actuated component.

As described herein, users may want to have more than one miniature remote controller mounted at a given location. They will be sold in assorted colors for this purpose. However, if too many miniature remotes are mounted together, their small size becomes defeated. For this situation, a three-position selector switch 120 may be incorporated on the side of the miniature remote controller 100 that can slide among multiple switch positions shown by tic marks at reference numerals 124 *a, b,* and *c.* In this example, there are three switch positions for the selector position, but this is only an example. There may be two or more than three switch positions for the selector switch.

The selector switch operates as follows. Each transmission from the miniature remote controller includes the command desired, an Identification Number for the particular controller, and redundancy for error amelioration. There are hundreds of millions of possible Identification (ID) Numbers. When selector switch 120 is moved to another position, it changes the Identification Number of the controller thereby becoming, in effect, a different controller. Accordingly, one miniature remote controller then functions as three different controllers without an increase in size. The three controllers thus simulated are completely independent, meaning each can be linked or unlinked to any controlled appliance (e.g., light or fan) without affecting the linkages of the other two simulated controllers.

Figure 3:
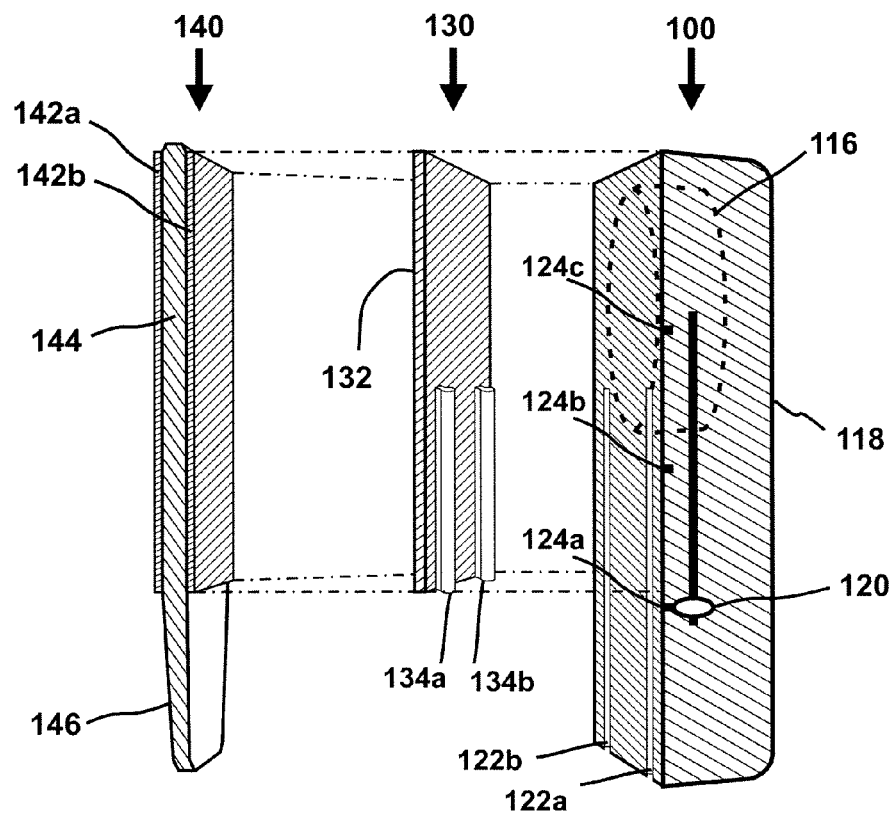
FIG. 3 is an exploded view of the miniature remote controller and its mounting components.

FIG. 3 is an exploded view of the mechanism for removably attaching the miniature remote controller 100 of FIG. 2 to a selected surface. Adhesive assembly 140 incorporates a readily removable adhesive strip 144 such as the 3M brand Command® having a backing paper 142 *a* which is removed before applying the left side of adhesive strip 144 to an object. 3M brand Command® adhesive incorporates an extended tab 146 for removal from the object after it is applied.

The miniature remote controller incorporates a plastic slider mechanism 130 with a roughened rear surface 132 to which is attached the right side of adhesive strip 144 after removal of backing paper 142 *b.* Plastic slider mechanism 130 is attached to the body 118 of the miniature remote controller by projecting ribs 134 *a* and *b* which slide in slots 122 *a* and *b* on the back of the miniature remote controller body 118 in FIG. 3, thereby allowing the user to slide the miniature remote controller up and down on the rib structure. In one embodiment, the controller body 118 can be completely removed from the plastic slider with extra force; in another embodiment it cannot. Removing it provides extra convenience but may cause pieces to be lost.

After installation, the user slides the miniature remote controller 100 downward on the rib structure so as to hide the Command® adhesive tab 146. To remove the miniature remote controller 100 from the object on which it was mounted or attached, the user slides the controller 100 upward to expose the tab 146, grabs the tab 146 firmly and pulls it downward, stretching it and cleanly removing the adhesive from both the controller and the object.

In one embodiment, the same plastic slider mechanism 130 allows the miniature remote controller body to be temporarily removed from its mounting position with extra force, leaving the plastic slider mechanism behind still glued in place. This is useful for a new linking or unlinking and various other purposes. Physically this is accomplished by a slight increase in the size of the ribs at their top and a slight decrease in the size of the slots at their bottom, not unlike the mechanism used to make the cap of a plastic pen "click" onto it. The plastic slider concept also allows for alternate plastic sliders of different shapes, for instance a plastic slider curved on the outside for mounting on tubular objects such as round chair-arms, rails, crutches, etc.

Figure 4:
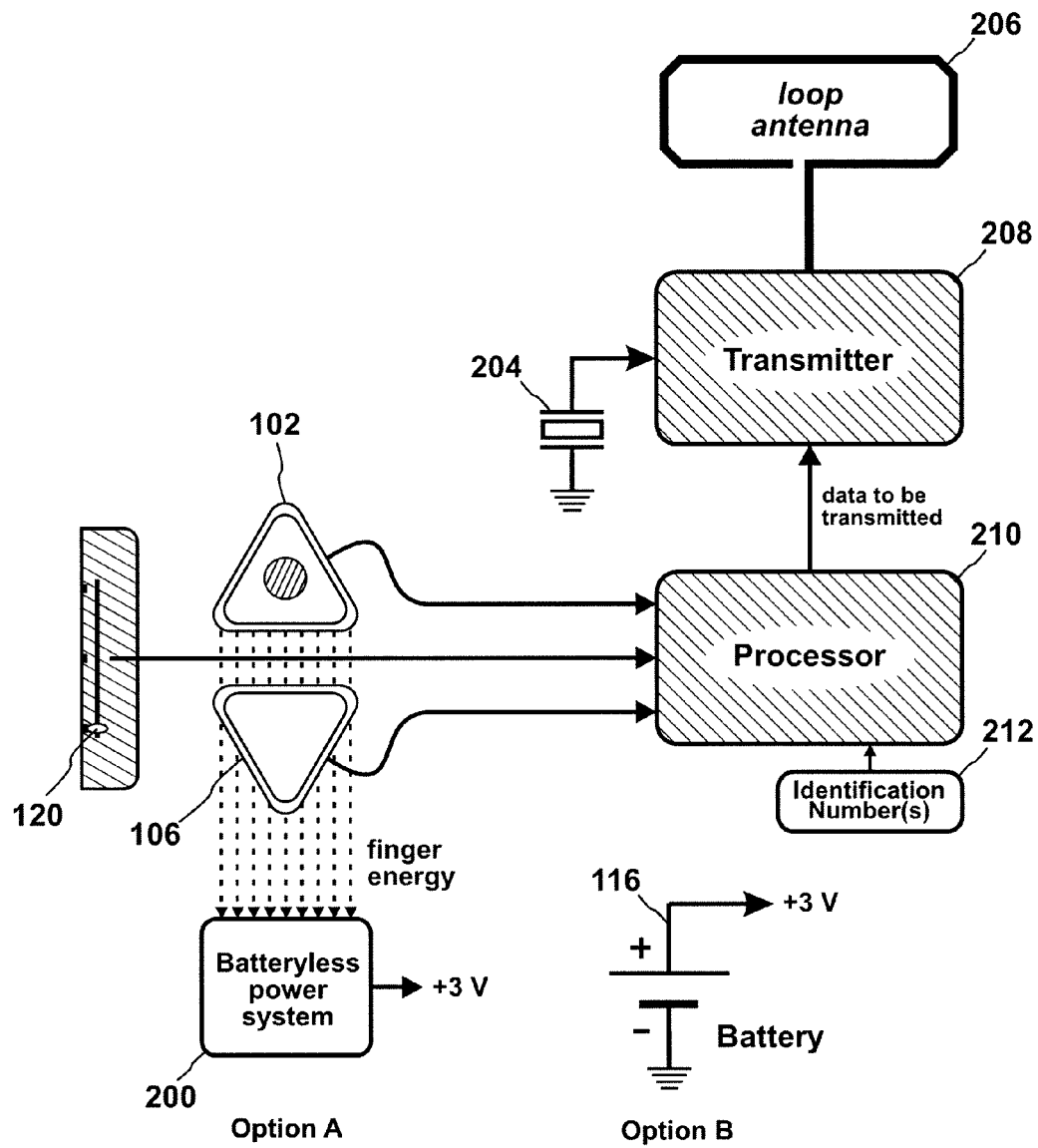
FIG. 4 is a block diagram of the transmitter circuitry in the miniature remote controller.

FIG. 4 is a block diagram of transmitter circuitry such as might be incorporated within the miniature remote controller 100 shown in FIGS. 1-3.

In one embodiment, power is supplied to the controller by battery 116 which may, for example, be a 3-volt lithium-ion button battery. In another embodiment, batteryless power system 200 harvests power from the user's button-pressing action. Piezoelectric or magneto transducers may be used. The batteryless embodiment uses specially designed power conservation circuitry throughout the controller. Each miniature remote controller has a preassigned Identification Number 212 embedded within it at manufacture. If a selector switch 120 is used, multiple Identification Numbers 212 are required as described in connection with FIG. 2. A simple way to embed the ID Number 212 is to include it in the firmware permanently installed with each processor 210. Read-Only memory, ROM, and other techniques are also available.

To conserve power, processor 210 and transmitter 208 may be designed so that they have a "sleep" state drawing negligible power when not in use or battery 116 will be quickly drained. The rfPIC12F675 is an integrated circuit chip from MicroChip® for use at 433.92 MHz combining the functions of processor 210 and transmitter 205. This chip can be asleep for many years without depleting even a small battery 116. An alternative circuit requiring additional components (not shown) eliminates all sleep current by disconnecting the rfPIC12F675 completely from battery 116 unless button 102 or 106 is pressed.

Software preloaded into the processor 210 (firmware) configures the transmitter circuitry and controls all its operations. The inputs to processor 210 are wires from up button 102, down button 106, and selector switch 120 if present. Ground connections (not shown) on the other terminal of button 102, 106 or selector 120 complete the circuit. Software in processor 210 monitors and times all button activity to infer the user's intentions. The software then generates the exact bit pattern to be transmitted and passes it to transmitter 208. Software also detects a stuck button, shutting down until it is released to conserve power.

The output of processor 210 is a binary signal turning on and off transmitter 208 and, optionally, a second signal shifting its frequency between one of two nearby values (Frequency-shift keying or FSK). FSK is somewhat more efficient than the simpler ASK (Amplitude-Shift Keying) where the RF carrier is simply on or off. The rfPIC12F675 is capable of either. Transmitter 208 may be as little as a single RF transistor and supporting passive components. Transmitter 208 typically is combined with a crystal 204 to precisely fix the transmitted carrier frequency. In the rfPIC12F675 crystal 204 operates at $1/16$ of the carrier frequency, being multiplied up by a PLL (Phase-Locked-Loop) within the chip. In the single-transistor implementation crystal 204 directly supplies the carrier frequency as a harmonic. Some transmitters go without any crystal 204, which requires hand-tuning each unit and considerably more frequency tolerance.

Loop antenna 206 radiates the RF signal. It is a wide trace around the periphery of the printed circuit board just under front surface 105 of miniature remote controller 100. Passive C and L components (not shown) resonate antenna 206 at the selected carrier frequency for efficiency. The single-transistor, no crystal, transmitter 208 implementation mentioned above may use antenna 206 as part of its tank circuit.

Table 1 below lists examples of the possible commands that may be transmitted by miniature remote controller 100, along with their meaning, the user action each requires, and the action the receiver will take if not otherwise clear. "Soft transition" refers to turning a light on or off gradually. "Slewing" refers to the user holding down a button until the light reaches the brightness she desires. Note that the transmitter does not transmit continuously when a button is held down, to conserve power, instead transmitting only a brief start and stop command. PRESET is the user's preferred light level, which the receiver interprets as the last level she slewed to. Empirically determined timing constants, preloaded at manufacture and identified at the bottom of Table 1, help infer user intensions.

The command list of Table 1 is by way of illustration only. It will be appreciated that relatively minor software changes can add new commands or modify the ones listed to meet changing requirements.

TABLE 1

Transmitted Commands

| Command Transmitted | User Action | Meaning | Comments |
|---|---|---|---|
| 0. LINK | hold U + D (>T_link) | Link or Unlink | Transmitter must be near receiver to be linked or unlinked to it. |
| 1. TURNON | tap U (<T_hold) | Soft transition to PRESET or full ON | to PRESET if level < PRESET to full ON if level ≧ PRESET |
| 2. TURNOFF | tap D (<T_hold) | Soft transition to full OFF | |
| 3. SLEWUP | hold U (>T_hold) | Begin slewing UP | brighter |
| 4. SLEWDN | hold D (>T_hold) | Begin slewing DOWN | dimmer |
| 5. STOPUP | release U | Stop slewing UP | TX suppressed if U was held > T_slew |
| 6. STOPDN | release D | Stop slewing DOWN | TX suppressed if D was held > T_slew |
| 7. FLASH | tap U + D twice | Start flashing | Flashes 0-100% brightness. Any key stops the flashing. |
| 8. CODE0 | tap U + D then tap D before T_gap | Special code 0 | UNDOCUMENTED |
| 9. CODE1 | tap U + D then tap U before T_gap | Special code 1 | UNDOCUMENTED |

Buttons
U = UP button
D = DOWN button
U + D = both buttons pressed together
Constants:
T_bounce Duration of button releasethat is ignored (e.g. 0.05 sec)
T_hold Duration interpreted as holding button rather than tapping it (e.g. 0.5 sec)
T_link Duration both buttons held before "LINK" command issued (e.g. 2 sec)
T_slew Maximum slew duration (e.g. 4 seconds)
T_gap Maximum gap allowed between associated actions (e.g. 1.5 sec)

All commands transmitted twice with checksum.

Table 2 is the state diagram used by the transmitter software residing in processor 210 to implement the command list of Table 1. Note that commands from the Command List are issued on transitions from one state to another. For clarity, some states are combined in this table. For example "one button pressed" is really two states: "UP button pressed" and "DOWN button pressed."

State 4, 'responsive slew mode," requires some explanation. Ideally, when the user desires a particular brightness she holds down the appropriate button until it is reached and stops. In practice, however, she is likely to overshoot and/or want to go back and forth to find the exact level desired. The software detects this situation and goes into 'responsive slew state.' In this state, a tap of a button is interpreted as a brightness tweak rather a turn-on or turn-off and the response is a fraction of a second faster.

TABLE 2

Transmitter State Diagram

| State | Name | Exit condition | # | Exit action | Next |
|---|---|---|---|---|---|
| STATE 0 | Both buttons unpressed (Standby) | either* button pressed | 1 | start timer: t = 0 | STATE 1 |
| STATE 1 | One* button pressed | both buttons released for Δt ≧ T_bounce | 0 | transmit: TURNON or TURNOFF | STATE 0 |
| | | both buttons pressed | 2 | none | STATE 2 |
| | | t ≧ T_hold | 1 | transmit: SLEWUP or SLEWDN | STATE 3 |
| STATE 2 | Both buttons pressed | either* button released for Δt ≧ T_bounce; t ≧ T_hold | 1 | none | STATE 6 |
| | | both buttons released for Δt ≧ T_bounce; t < T_hold | 0 | none | STATE 5 |
| | | t ≧ T_program | 2 | transmit: LINK | STATE 6 |

TABLE 2-continued

Transmitter State Diagram

| State | Name | Exit condition | # | Exit action | Next |
|---|---|---|---|---|---|
| STATE 3 | One* button held | this* button released for Δt ≧ T_bounce | 0 | if t < T_slew: transmit STOPUP or STOPDN | STATE 4 |
| | | other* button also pressed | 2 | if t < T_slew: transmit: STOPUP or STOPDN | STATE 4 |
| STATE 4 | Responsive slew mode | both buttons released for Δt ≧ T_hold | 0 | none | STATE 0 |
| | | one* button only pressed Δt ≧ T_bounce | 1 | transmit: SLEWUP or SLEWDN restart timer: t = 0 | STATE 3 |
| STATE 5 | Both buttons tapped once | t ≧ T_gap | 0 | none | STATE 6 |
| | | one* button only pressed and then released | 1 | transmit: CODE0 or CODE1 | STATE 6 |
| | | both buttons pressed | 2 | transmit: FLASH | STATE 6 |
| STATE 6 | Wait for complete release | both buttons released for Δt ≧ T_hold | 0 | none | STATE 0 |

"#" in Table 2 above means the number of buttons pressed to exit that State.
*Identity of button is a sub-state not differentiated for clarity.
Variables:
t timer elapsed time
Constants:
T_bounce Duration of button release that is ignored (e.g. 0.02 sec)
T_slew Maximum slew duration (e.g. 4 sec)
T_hold Duration interpreted as holding button rather than tapping it (e.g. 0.5 sec)
T_link Duration both buttons held before "LINK" command issued (e.g. 2 sec)
T_gap Maximum gap allowed between associated actions (e.g. 1.5 sec)

Figure 5:
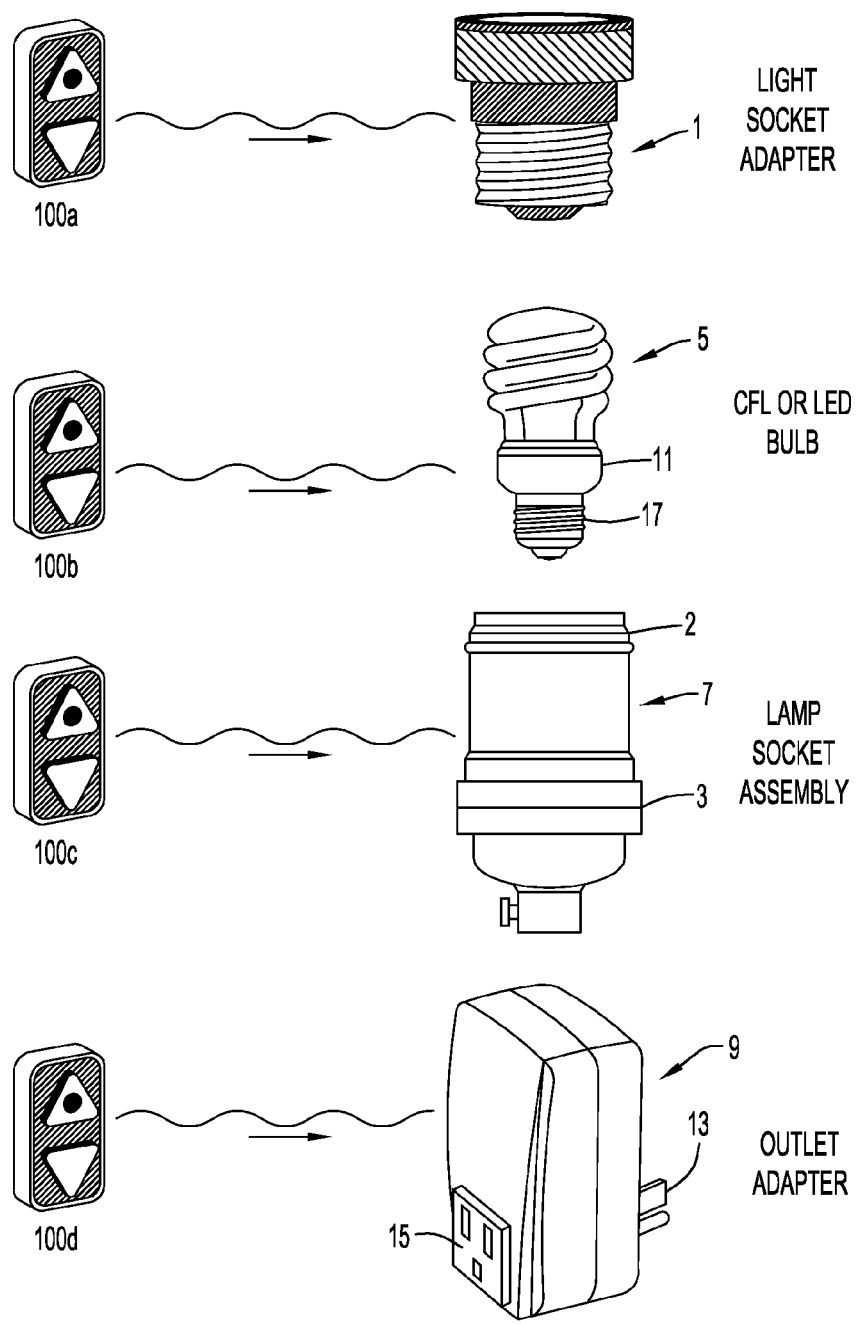
FIG. 5 shows a miniature remote controller controlling four receiver options.
Figure 6:
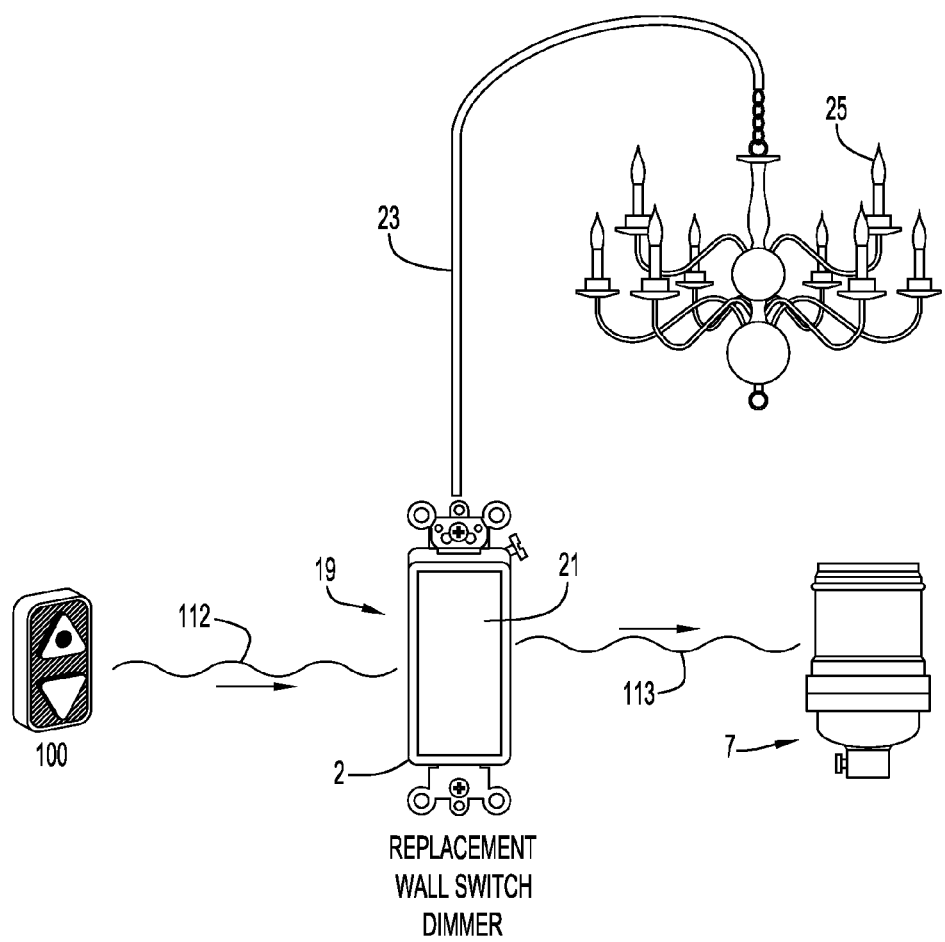
FIG. 6 shows a miniature remote controller controlling a wallswitch receiver.

FIGS. 5 and 6 show miniature remote controller 100 controlling five different kinds of receivers compatible with the system disclosed. For clarity, each controller is shown controlling one and only one receiver. More complicated arrangements are allowed, see discussion of FIG. 7 below. Indeed, any arrangement is possible with the system disclosed herein.

A first kind of receiver for a control signal from miniature remote control 100a is light socket adapter 1. This adapter is screwed into a standard socket and controls a light bulb screwed into it. Its mechanical and electronic particulars are disclosed and the aforementioned co-pending patent application.

Figure 9:
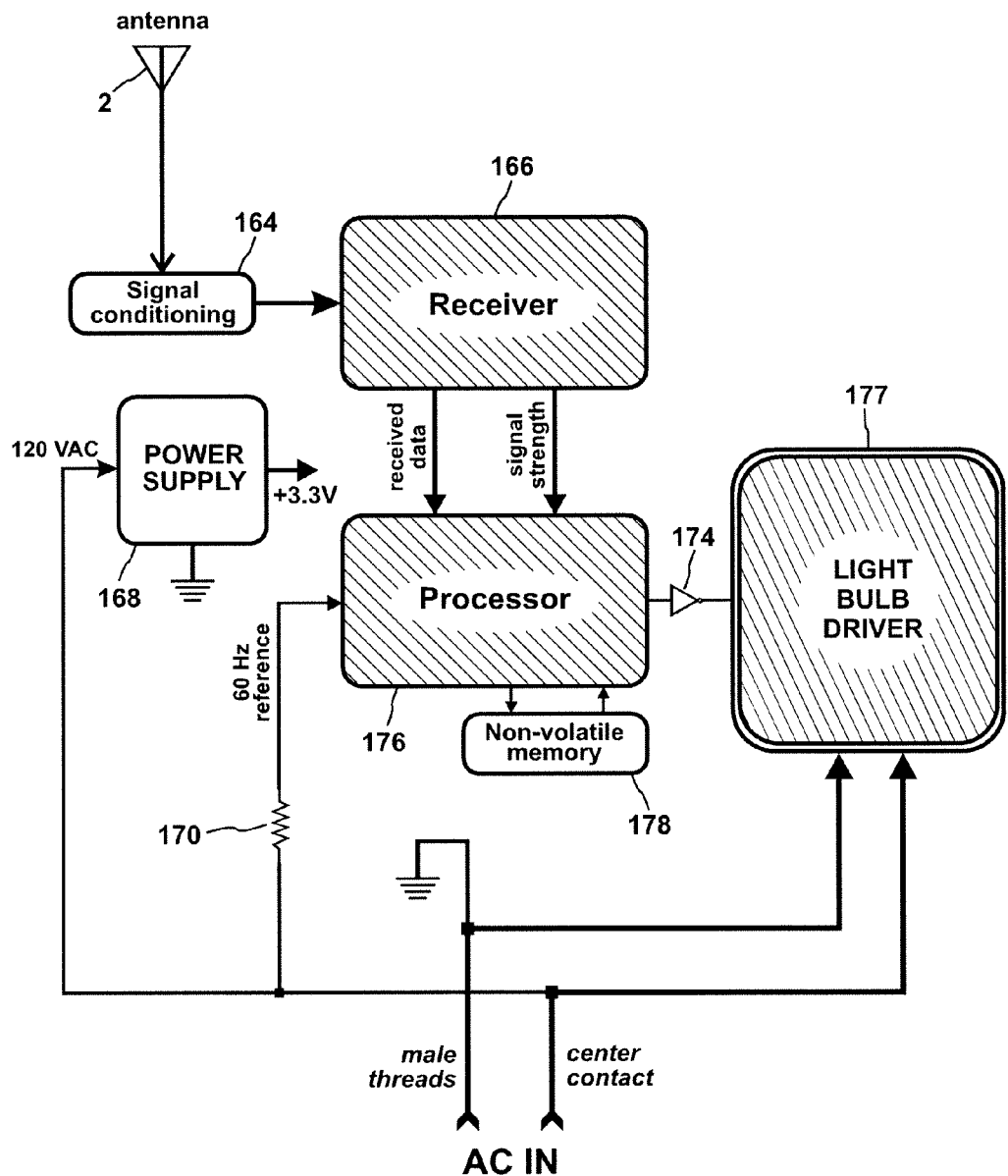
FIG. 9 is a block diagram of receiver electronic circuitry residing in a light bulb.

A second kind of receiver is located in pod 11 of a CFL or LED light bulb 5. The long life and high initial cost of CFL and LED bulbs justify including additional electronics within their pods 11. Bulb 5 is screwed by its base 17 into a fully powered socket not on a dimmer circuit and then controlled through its radio receiver. FIG. 9, described hereinafter, is a block diagram of the electronic circuitry within light bulb 5. In one embodiment, light bulb 5 is sold bundled with two miniature remote controllers 100b prelinked to it (see Linking and Unlinking, described hereinafter). In one embodiment, even when a miniature remote controller is prelinked to a particular receiver, the user may unlink or link it at will to that receiver or any other after purchase.

A third kind of receiver is located in lamp socket assembly 7. If the body of lamp socket assembly 7 is insulating, for example Bakelite, antenna 2 would be embedded in, or just within, that insulating body. If the body of 7 is conducting, such as the popular brass type, a ring of brass 2 would be isolated from there rest of the body to act as antenna 2. A break in that antenna ring 2, not shown, is useful to maximize its sensitivity. The antenna 2 is described further hereinafter in connection with the receiver circuitry.

Figure 10:
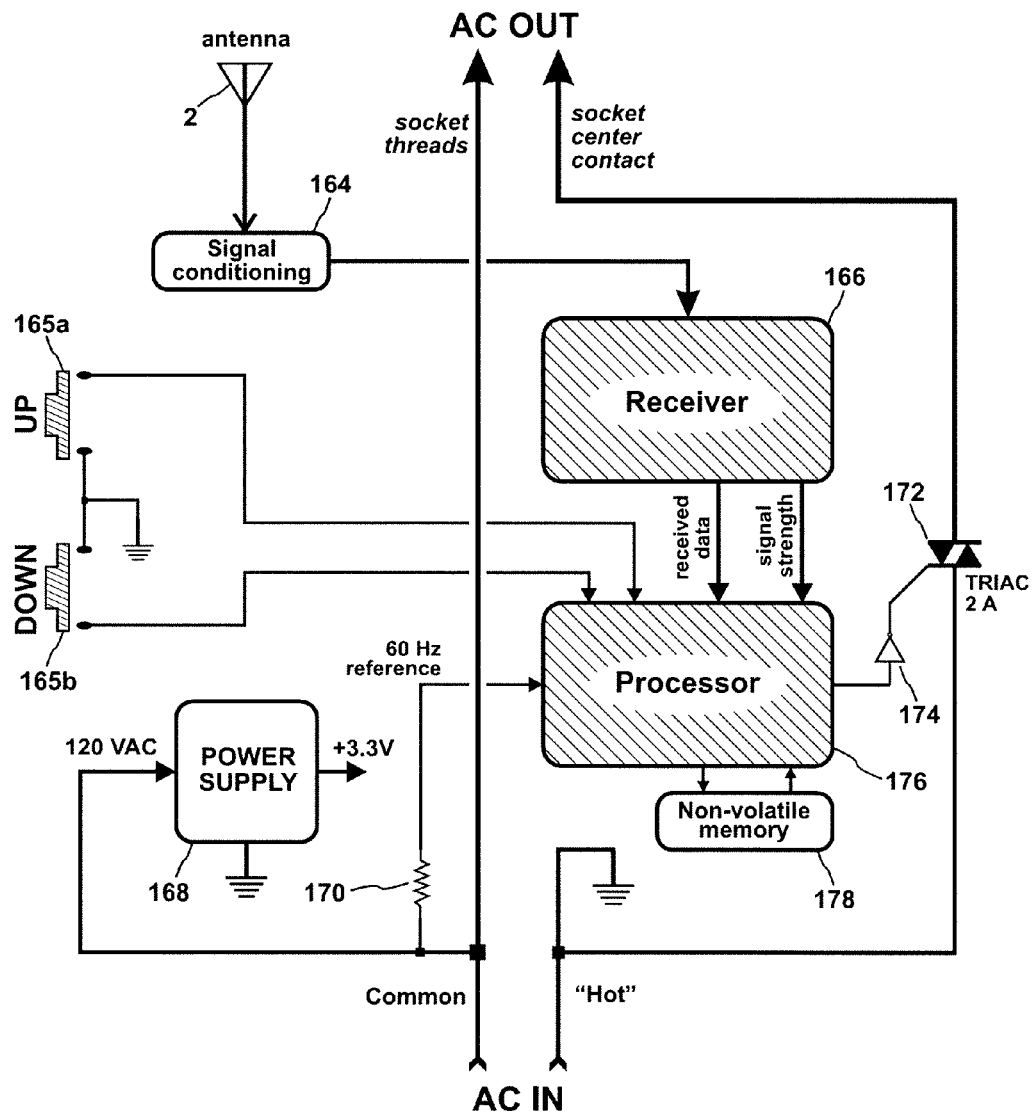
FIG. 10 is a block diagram of receiver electronic circuitry residing in a lamp socket assembly.

In one embodiment lamp socket assembly 7 has a user control on it; in another embodiment there is no user interface except through miniature remote controller 100c. One embodiment of the user control is control ring 3 which the user rotates clockwise for UP and counterclockwise for DOWN and which is spring loaded to return to a neutral position between UP and DOWN. Alternatively, a more familiar user interface would be a toggle bar through the body of lamp socket assembly 7 or a rotary dial on it. The control ring 3 shown is more user-friendly because it works the same from all directions. The table lamp need not be rotated to a particular orientation on the table nor would the user need to grope under the lampshade is locate the control. FIG. 10, described hereinafter, is a block diagram of the electronic circuitry within lamp socket assembly 7.

Figure 11:
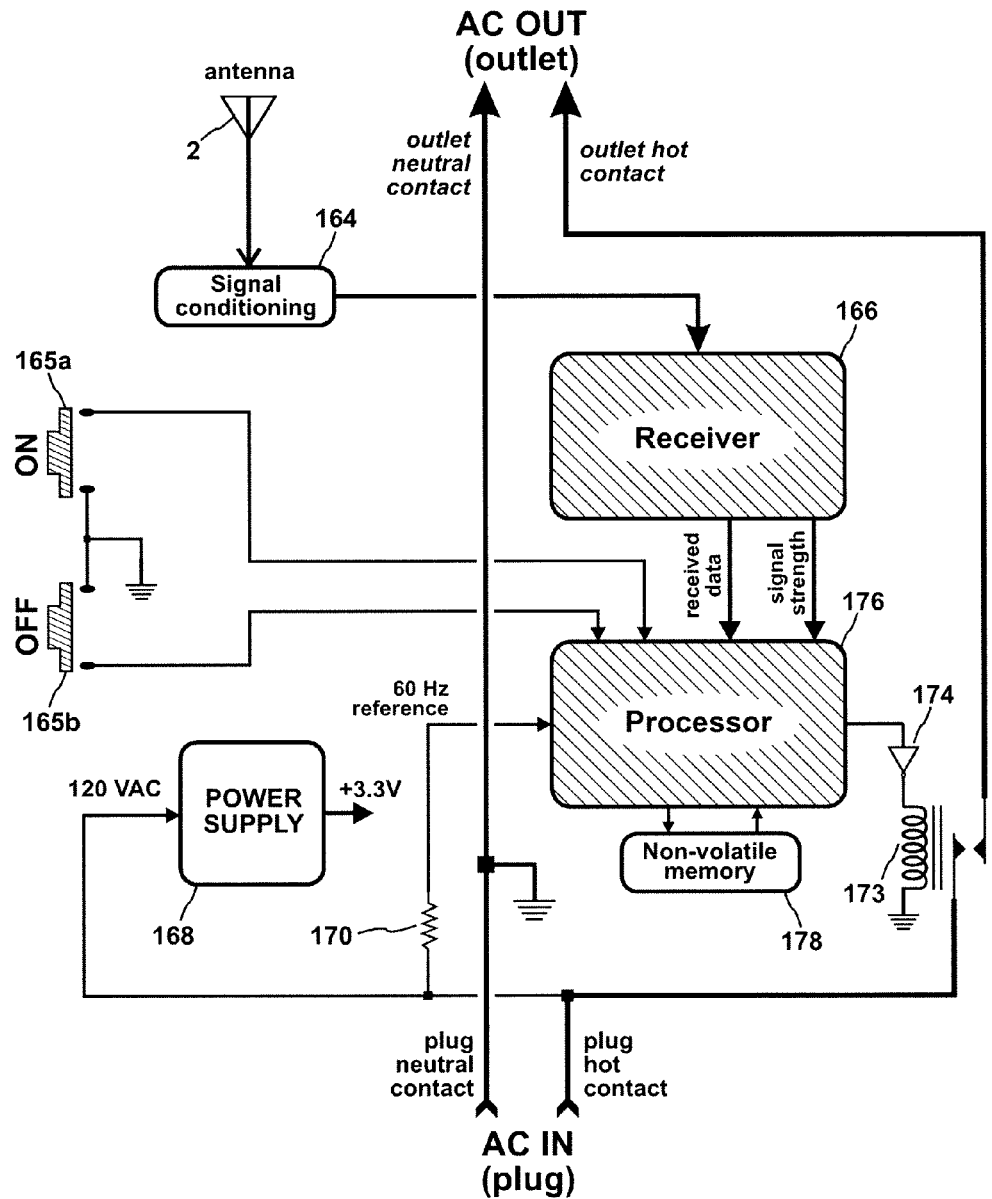
FIG. 11 is a block diagram of receiver electronic circuitry residing in an outlet adapter.

A fourth kind of receiver is located in outlet adapter 9. It functions plugged into a wall outlet by its plug 13 with the appliance to be controlled in turn plugged into its outlet 15. Unlike the other four receivers in FIGS. 5 and 6, outlet adapter 9 is non-dimming. It operates ON and OFF only. Any appliance may be plugged into its outlet 15 and turned ON or OFF remotely, including appliances drawing much more current than a light bulb. The UP button on miniature remote controller 100d functions as ON and the DOWN button functions as OFF. This interpretation is handled by the receiver in outlet adapter 9 without modification to controller 100d. Non-volatile memory in the receiver (described hereinafter) enables the outlet adapter to remain ON across a power interruption, unlike competing devices. Optionally, there may be an on-off switch on the body of outlet adapter 9 which controls it locally and without conflict with remote control 100d. FIG. 11, described hereinafter, is a block diagram of the electronic circuitry within socket adapter 9.

A fifth kind of receiver is located in wallswitch dimmer 19 of FIG. 6 and is intended as a replacement for an existing wall dimmer switch. Wallswitch 19 is hardwired to light fixture 25 through pre-existing building wiring 23. It is controlled either by its own switch, such as rocker switch 21 shown or by signal 112 received from miniature remote controller 100. Neither method of control excludes the other or takes precedence over it. To improve reception, its antenna 2 is located close to the surface of the switchplate, not shown.

Wallswitch 19 has two features not present in any of the other receivers described above.

Firstly, it may be in the same AC circuit with one or more additional wallswitches already wired to share control of light fixture 25 in the manner of a so-called three-way or four-way switch. For example, wallswitch 19 may be at the top of a stairs and a remote wallswitch controlling the same light at the bottom of the stairs. Remote wallswitches would be replaced by compatible remote switches, not shown. These compatible remote switches are much simpler than wallswitch 19. They do not include a receiver or processor—just a rocker switch 21, or equivalent, and means to communicate its activity back to main wallswitch 19 via existing wiring. Wallswitch 19 will receive user commands from any number of such remote wallswitches, from its own switch 19, or by radio signal 112 from any number of miniature remote controllers without prejudice or conflict among them.

Figure 12:
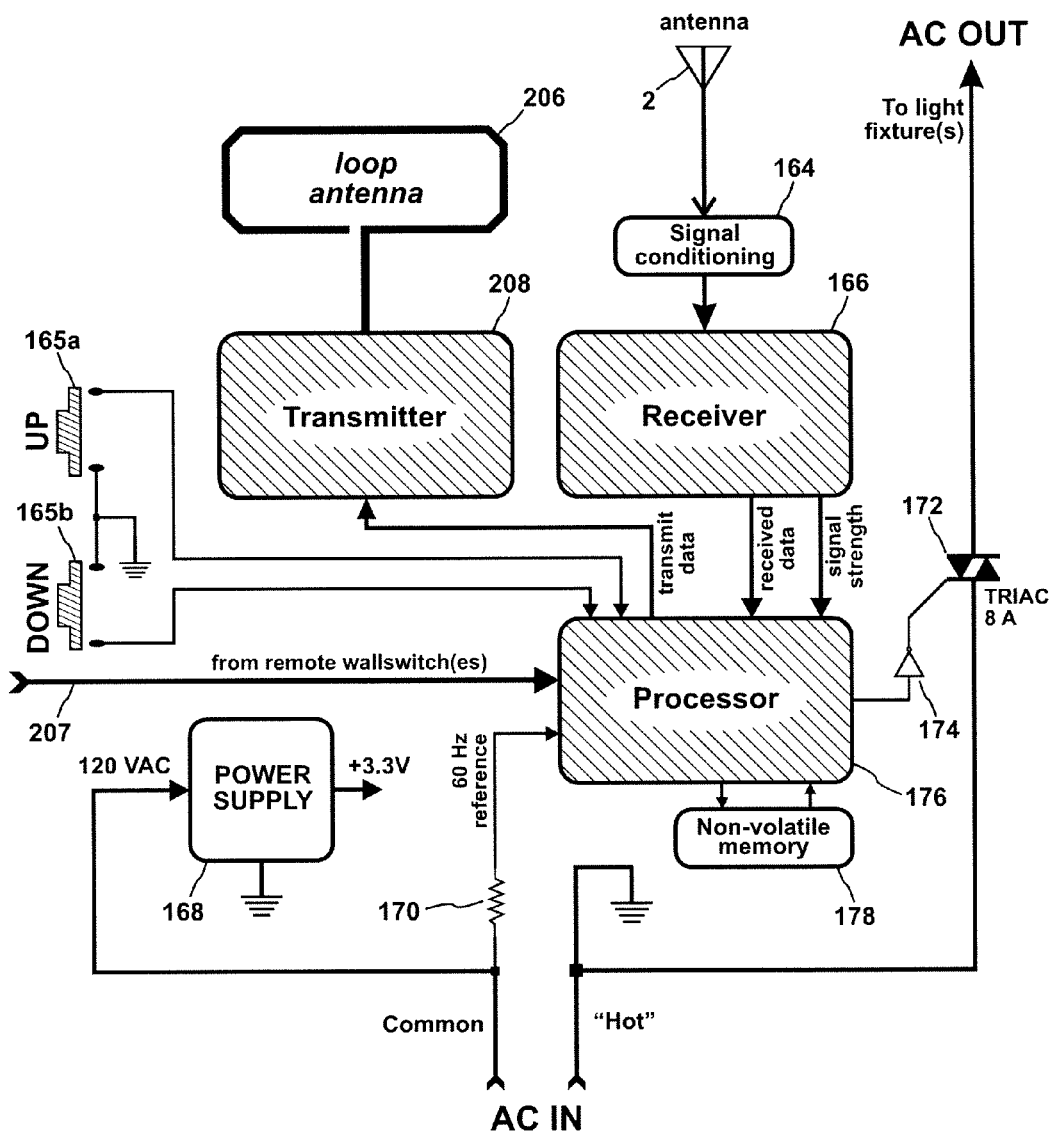
FIG. 12 is a block diagram of receiver electronic circuitry residing in a wallswitch dimmer.

Secondly, wallswitch 19 has, in one configuration, the ability to transmit commands as well as receive them. Thus wallswitch 19 could dim a table lamp equipped with lamp socket assembly 7, along with its own chandelier even though table lamp outlets, under electrical code, normally are not wired to dimmer switches. Wallswitch dimmer 19 becomes linked (see Linking and Unlinking described below) to another receiver by assuming the Identification Number of a particular miniature remote controller brought near it with both buttons on both devices pressed and held for two seconds. This process is used, rather than giving wallswitch 19 its own ID number, because the wallswitch is not portable and therefore generally cannot link on its own to another receiver. By "lending" its ID number, the particular miniature remote control can then act as proxy for wallswitch 19 and link or unlink it to distant receivers. FIG. 12, described below, is a block diagram of the electronic circuitry within wallswitch 19 to accomplish all the above. It will be appreciated that rocker switch 21 is just one example of user input at wallswitch 19. It could be, for instance, two large buttons square buttons or any of an unlimited number of other possible designs.

Linking and Unlinking

A remote controller is said to be linked to a receiver if the receiver will accept commands from that remote controller. A remote controller is said to be unlinked to a receiver if it is not linked to it. Linking is the operation of becoming linked and unlinking is the operation of becoming unlinked.

The receiver must know whether it is to respond or not respond to the signal from a given miniature remote controller, i.e., whether it is linked or unlinked to that particular controller. Several systems are in common use for linking and unlinking of remote controllers and their receivers. Most take the form of entering special codes and/or pressing a "learn" button or using a special tool on one or both units. For maximum flexibility, the remote controller here incorporates means for easily linking and unlinking to a given receiver at the sole discretion of the user, and links and unlinks in a more intuitive and user-friendly manner than any of these existing systems. The user holds the miniature remote controller in close physical proximity to the light or fan or similar appliance and presses both buttons 102 and 106 at the same time for two seconds. The receiver detects this action and the higher signal strength and authorizes the linkage. This same procedure is used for linking or unlinking. This linking and unlinking process is described in more detail hereinafter in connection with FIG. 8.

Linking a remote controller to a receiver does not preclude the receiver from being linked to other remote controllers, nor does it preclude the remote controller from being linked to other receivers. In other words, a given miniature remote controller may be linked or unlinked from a given receiver without affecting the relationship(s) between that remote controller and other receivers or the relationship(s) between that receiver and other remote controllers. Arbitrary combinations are possible without interference with one another.

Figure 7:
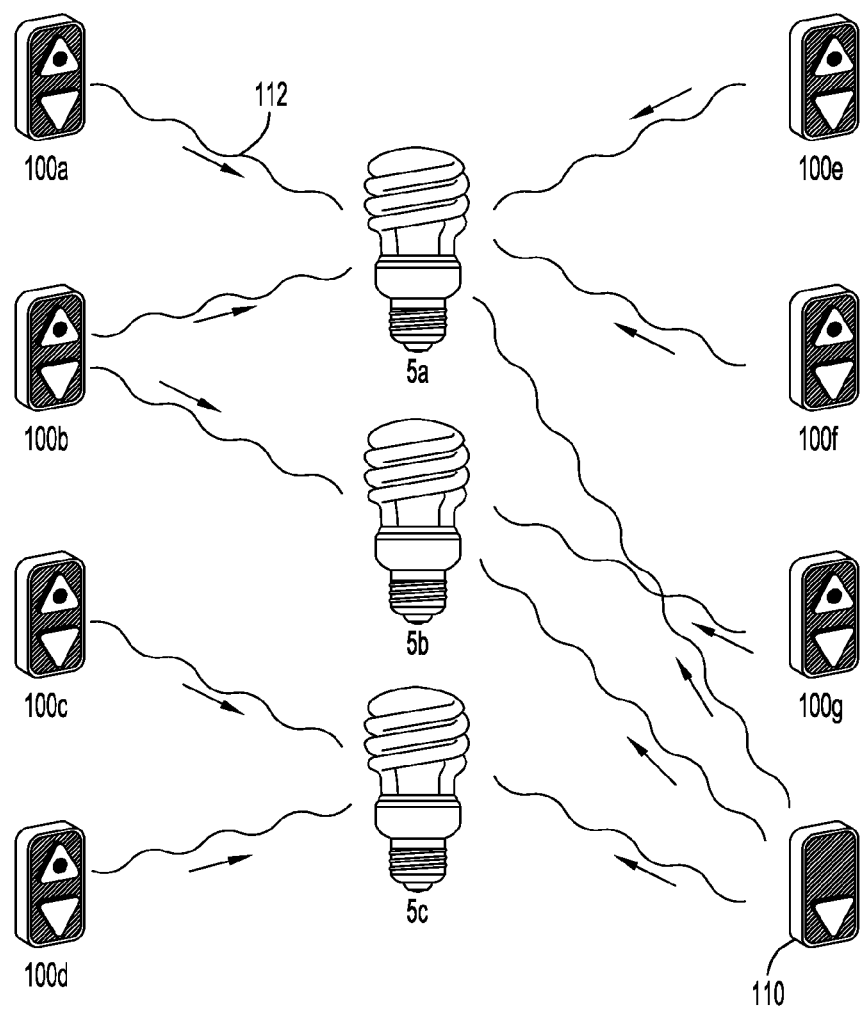
FIG. 7 shows an arbitrary combination of miniature remote controllers and receivers.

FIG. 7 depicts one such arbitrary combination, wherein 100a through 100g are seven miniature remote controllers, and 110 is an eighth miniature remote controller with only an OFF button. 5a, b, and c are three light bulbs, and 112 is a radio frequency wave moving in the direction indicated by the arrow beneath it, thereby providing a link to the designated bulb.

In FIG. 7, the following combinations are shown: (a) five miniature remote controllers 100a, b, e, f and 110 control one light 5a, (b) two lights 5a and 5b are controlled by one controller 100b, and (c) one controller 110 can turn off all three lights 5a, b, and c. All of the controllers and all of the lights can be in a single room and operate without interference among each other. Accordingly, a person can sit in one chair in a room where miniature remote controllers are placed and control a single light or a set of several different lights, and move to another chair in the same room or a nearby room where controllers are placed and control the same lights, other lights, or the same plus other lights.

Figure 8:
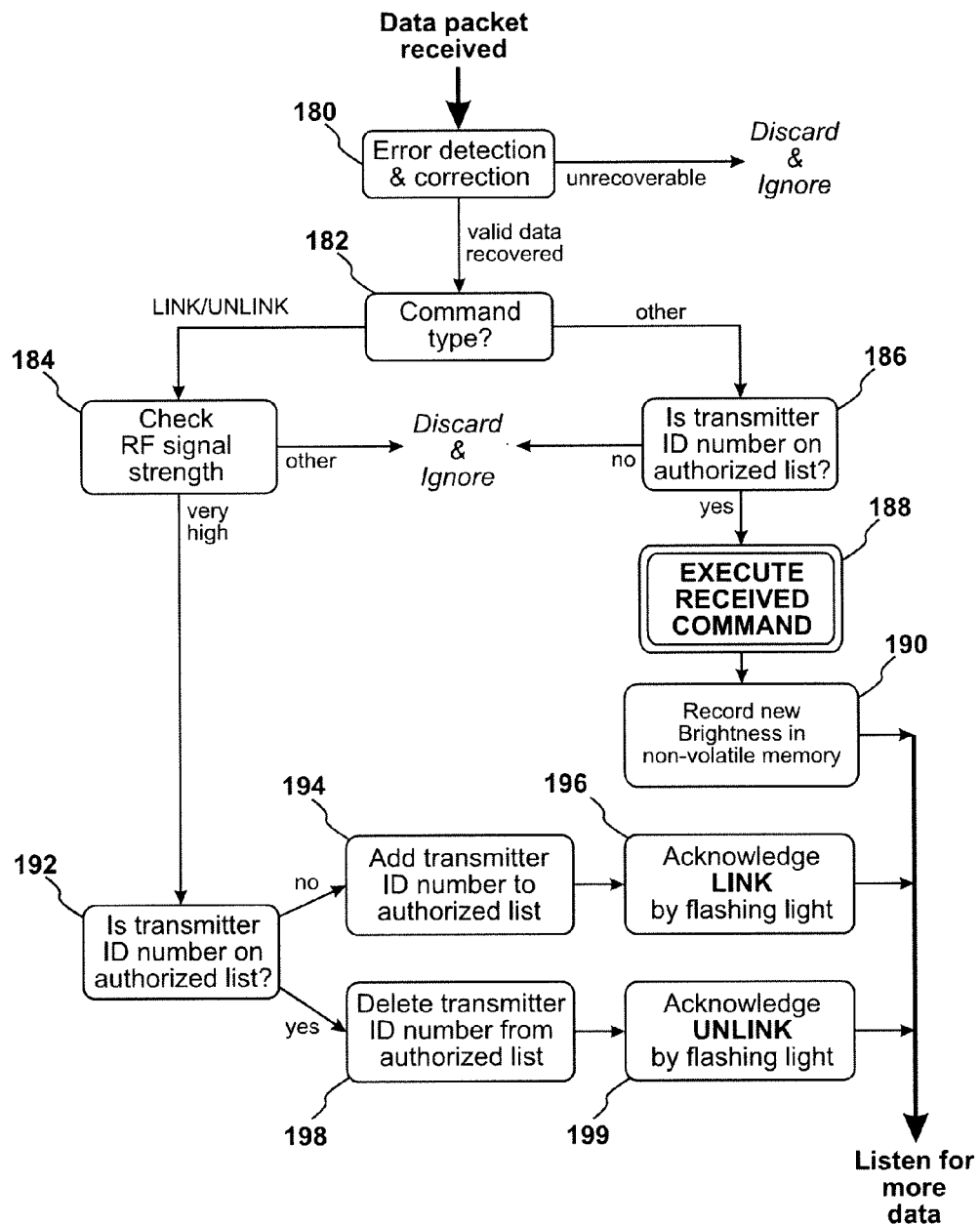
FIG. 8 is a flow chart for the operations of a receiver linking and unlinking to a miniature remote controller.

FIG. 8 is a flow chart of the receiver software operations with emphasis on linking and unlinking. A stream of binary data is output by radio receiver 166 to processor 176. It is the job of this software executed by processor 176 to interpret and act on it.

When no signal is present there is still a data stream. The AGC in radio receiver 166 "opens up" and converts RF noise into zeros and ones. That noise may be random or from manmade sources.

A compatible transmitter, such as the miniature remote controller of FIGS. 1, 2, and 3, transmits its data packets including various redundant information. Specifically, a data packet comprises:

(a) an unchanging header
(b) the transmitter's Identification Number (28-bits)
(c) a command code
(d) byte parity bits and a checksum.

All the above is transmitted a second time with a deliberately unpredictable gap between the two.

Transmission of each packet requires about 0.1 second. If the software 180 recognizes valid data but cannot recover it without error, the data is ignored and discarded and the system begins listening again. If identical data is received error-free twice in a row closely spaced, the second packet is ignored. Error correcting coding allows certain types of bit errors to be corrected and the data rendered usable.

Once valid data is in hand, software 182 examines the imbedded command code representing the user's intentions.

If the received command is other than Link/Unlink, receiver software 186 immediately checks whether the transmitter's Identification Number matches any in its authorized (linked) list located in the receiver's non-volatile memory. If the transmitter is unauthorized (not linked) its command is discarded, has no effect whatsoever, and that transmitter remains unlinked.

If, on the other hand, the transmitter is authorized its command is executed 188. When that execution results in a new level (brightness), including OFF, for the controlled light, which it normally does, that new light level is recorded 190 in non-volatile memory 178 for restoration should a power interruption occur.

If the received command is Link/Unlink a different chain of events occurs. Link and Unlink use the same transmitted code because our one-way communication leaves the transmitter no way of knowing whether it is already linked to a given receiver. For Link/Unlink, and only for that command, the received signal strength is interrogated 184. Only if signal strength is very high, indicating the transmitter is very near, does the software proceed.

If the signal strength is very high, the transmitter's Identification Number is checked 192 against the authorized list. If it is absent, it is added 194 (Linking) and if it is present, it is deleted 198 (Unlinking). If the list is full (63 authorized transmitters), preventing a Linking, the software deletes the oldest ID and proceeds with the Linking.

If a light bulb is present, successful Linking or Unlinking is acknowledged to the user by flashing the light twice. The flash pattern is different for Link 196 and Unlink 199 so that experienced users will recognize which has occurred. "Link" is dot-dash and "Unlink" is dash-dot.

Receiver Circuitry and Operation: Inside the Light Bulb

FIG. 9 is a block diagram of receiver circuitry such as might be incorporated within light bulb 5 shown in FIG. 5. POWER SUPPLY 168 converts the incoming 120 VAC power (from the lamp wiring) to low-voltage DC, in this case 3.3 volts, for powering chips and other components of the receiver. The incoming radio signal is received by an antenna 2 within the light bulb pod 11 of FIG. 5 or other means. The signal from the antenna 2 is conditioned before being coupled into receiver 166 for amplification and detection. Signal conditioning 164 may comprise impedance matching among the various RF components, SAW (Surface Acoustic Wave) filtering to suppress out-of-band signals, and, optionally, preamplification near the antenna 2.

Receiver 166 typically incorporates an integrated circuit chip designed for the frequency band selected. For example, rfRXD0420 is an integrated circuit receiver chip from MicroChip® for use at 433.92 MHz. The receiver chip provides Low Noise Amplification (LNA) heterodyning, mixing, Automatic Gain Control (AGC) and other functions. The receiver chip is supported by external components not shown, most importantly a quartz crystal to set the frequency and an Intermediate Frequency (IF) filter to reject nearby signals. The output of the Receiver is an asynchronous binary data stream indicating, in the simplest Amplitude Modulation (AM) mode, presence or absence of the RF signal by a one or zero respectively. From this binary data, processor 176 extracts commands from remote control transmitter devices, such as the miniature remote controller of FIG. 2, interprets them, and executes them. Of particular importance (for linking and unlinking) receiver 166 also puts out a slowly-varying analog voltage equal to (approximately) the logarithm of the RF signal strength which it derives from its Automatic Gain Control (AGC) activity.

Processor 176 typically is a self-contained integrated circuit microprocessor, such as PIC12F683 processor chip from MicroChip. Software preloaded into the chip (firmware) configures the receiver circuitry and controls all its operations. A small non-volatile memory (NVM) 178 holds data across a power failure. (In the PIC12F683 integrated circuit chip NVM 178 is included in processor 176.) The operation of processor 176 interpreting and acting upon the data stream from receiver 166 is detailed in FIG. 8, above.

The output of processor 176 controls light bulb driver 177. "Light bulb driver" refers to the circuitry in the electronics pod 11 in FIG. 5 near the base of CFL bulb 5, or the corresponding circuitry in an LED bulb. The pod circuitry supplies current and voltage to the actual light-producing element(s) and is particularly complex in the case of a dimmable CFL.

The interface 174 of light bulb driver 177 with the remainder of FIG. 9 may be implemented several ways depending on the volume of production anticipated. Inserting the circuitry of FIG. 9 within the pod 11 can be achieved with the cooperation of the manufacturer of bulb 5. Generally, greater integration of the new circuitry with the existing circuitry results in lower per-unit cost, smaller size, lower power, and better dimming performance but at increased engineering and tooling cost.

The lowest level of integration between new and existing circuitry, represented by interface 174, is to keep them entirely separate and simply supply power to light bulb driver 177 via a TRIAC. (This is similar to the arrangement of FIG. 10 but without buttons 165*a* and 165*b*, in effect simply moving the electronics of FIG. 10 from light bulb socket 7 into bulb pod 11 unchanged.)

A second level of integration would be to supply driver 177 with full AC power at all times, as shown at the bottom of FIG. 9, but then intervene in driver 177 at a point where it controls bulb dimming with a signal from processor 176, buffered as required by interface 174 (shown schematically as an amplifier). That input could be digital or analog, as required by driver 177, with analog requiring a digital-to-analog (D/A) converter within interface 174. Any non-linearity in the process can be corrected easily in processor 176 software.

A third level of integration would be to share subsystems between the two, especially power supply 168 and processor 176. Current light bulb drivers 177 have no processor but could benefit from one.

The highest level of integration would be to combine functions of driver 177 and the rest of FIG. 9 into a single Integrated Circuit (IC) chip. Early CFL bulbs had drivers 177 not deployed on ICs but are currently evolving toward the use of ICs.

Receiver Circuitry and Operation: In a Lamp Socket Assembly

FIG. 10 is a block diagram of receiver circuitry such as might be incorporated within the lamp socket assembly 7 shown in FIG. 5. POWER SUPPLY 168 converts the incoming 120 VAC power (from the lamp wiring) to low-voltage DC, in this case 3.3 volts, for powering chips and other components of the receiver. The 120 VAC input power is also passed through to the AC output (chopped when dimming) by the TRIAC 172 which is shown wired in the manner used ubiquitously for dimming light bulbs. Two ampere TRIAC 172 will easily drive a 150 watt light bulb.

The incoming radio signal is received by antenna 2 in the lamp socket assembly of FIG. 5 or other means such as the use of power wiring as an antenna. Conditioning the signal from antenna 2, detecting it in receiver 166, and interpreting it in the processor all occur as described above in connection with FIG. 9.

The output of processor 176 here is a binary signal that fires TRIAC 172 through an isolation transistor, indicated schematically as amplifier 174. After firing, TRIAC 172 remains conducting until the next zero-crossing of the AC current. Processor 176 includes timers the software uses to accurately set the firing times of TRIAC 172 according to the brightness of the light desired. If the light is to be full OFF, TRIAC 172 never fires. If the light is to be full ON, TRIAC 172 is driven to fire continuously or nearly so.

The bulb screwed into lamp socket assembly 7 is controllable by any miniature remote controller 100 that is linked to it. Optionally, it may also be controlled by a hand control on the lamp socket assembly itself. UP button 165a and DOWN button 165b represent this hand control schematically and are not meant to limit the hand control to actual buttons. Another implementation is a bar type switch passing diametrically through socket assembly 7 or a twist knob, both structures common on such socket assemblies. However, unlike these common switches, their equivalent here would be spring-loaded—returning to a rest position when released. This is needed to prevent conflict among different controls of the same light. If the user interface means has mechanical memory of where the user left it, an incoming radio signal could put the light in a state contradicting that memory. For example, if a rotary knob were turned all the way up and then an incoming radio signal turned the light down, the knob would be incapable of turning it back up because it cannot go any further. Momentary switches, represented schematically as push buttons in FIG. 10, solve this conflict. One embodiment for a lamp socket control is control ring 3, as shown in FIG. 5. The user rotates it clockwise to engage the momentary switch 165a for UP and counter-clockwise to engage the momentary switch 165b for DOWN, with control ring 3 returning to its neutral position when released. Unlike conventional socket assembly switches and knobs, the control ring 3 is the same from all directions, eliminating the need to feel around under the lampshade to locate the switch.

Software in processor 176 treats inputs from momentary switches 165a and 165b exactly as commands coming in over the air via antenna 2, i.e. as if the switches were on their own miniature remote control. In other words, user actions on switches 165a and 165b are interpreted according to Table 1 and Table 2 above except no LINK command is recognized. The FLASH command, requiring 165a and 165b pressed together, may or may not be available and may be assigned to a different user action than shown in the Tables.

Another input to processor 176 is the AC input voltage itself, buffered by a very large resistor 170 and treated as a binary signal. This signal is required by the software to control TRIAC 172 and fire it in a precise timing relationship with the AC voltage. Noise on the AC power line is suppressed by the software. This 60 Hz input is also used to time the "Flash" function so that multiple lights flashing stay perfectly synchronized, even when they're on different circuits. Note that in FIG. 10 and FIG. 12, the "hot" side of the incoming AC becomes ground for the electronic circuitry. This is required because TRIAC 172 must be in the "hot side" of the AC line and hence its gate must be driven relative to "hot," forcing the entire circuit shown, including receiver 166, to be floating at 120 VAC.

In one version of the software, NVM 178 is used for two purposes. First, it contains the list of the Identification Numbers of remote controllers linked to this receiver and hence authorized to control it. The PIC12F683 integrated circuit chip allows up to 63 remote controllers with 28-bit ID numbers to be linked to the receiver at one time. The other use of NVM 178 is to store the current light level. This unique feature of the receiver circuitry disclosed herein allows lights to return to their previous brightness after a power failure. The user does not need to reset the lamp socket assembly's circuitry after a momentary power interruption or if a particular socket is accidentally turned off. A brand new lamp socket assembly powers up with the light full ON.

Receiver Circuitry and Operation: In a Plug and Outlet Adapter

FIG. 11 is a block diagram of receiver circuitry such as might be incorporated within the outlet adapter 9 shown in FIG. 5. RF controlled socket adapters, not compatible with the system described herein, are commercially available in both dimmable and on-off only configurations. The dimmable configurations are intended for a table lamp or the like but are not good practice, and possibly in violation of electrical codes, because motor driven, electronic, or heating appliances might be plugged into them, possibly overheating or behaving unpredictably when powered by the chopped waveform used to dim light bulbs. For that reason, only an on-off version is presented in FIG. 11. A dimmable version is possible, using the circuit of FIG. 10, if such a version were desired.

The on-off socket adapter of FIG. 11 uses relay 173 instead of TRIAC 172. Relay 173 may be driven directly by processor 176 or through a transistor buffer 174 based on various engineering considerations. Preferably, relay 172 is rated for the full current of an outlet socket, which is 15 amperes AC in the U.S. A TRIAC is not practical at 15 A in this application because heating and wasted power would be high. Relays of the single-coil type 173 shown in FIG. 11 continually dissipate only a small amount of power, tens of milliwatts, in the ON position. If desired, even that power can be eliminated using a two-coil latching relay, not shown, which is more expensive and may require a second signal from processor 176. Note the difference in AC polarity between FIG. 11 (bottom) and the TRIAC circuits of FIGS. 10 and 12. Because relay 173 provides isolation, internal ground is the same as AC neutral in FIG. 11.

Outlet adapter 9 (FIG. 5) may optionally be configured with its own ON-OFF switch, shown as 165a and 165b in FIG. 11. This would be a momentary-ON, momentary-OFF switch, not a toggle switch, to preclude conflict with incoming RF commands as discussed in connection with 165a and 165b in FIG. 10.

Unlike competing products, outlet adapter 9 remembers its state across a power failure using non-volatile memory 178 and the same software that remembers light brightness in dimming receivers. Consequently, a fan will not shut off on a hot day just because the power flickered. See the description of software flow chart shown in FIG. 8, item 190, for further information on this feature.

Receiver Circuitry and Operation: In a Wallswitch Dimmer

FIG. 12 is a block diagram of receiver circuitry such as might be incorporated within wallswitch dimmer 19 shown in FIG. 6. One embodiment of the wallswitch dimmer 19 also includes transmitter 208 whereby wallswitch 19 may control a light or appliance 7 that is not wired to that wallswitch, such as a table lamp or a light in an adjacent room. As with the other receivers described above, what is or is not controlled is at the discretion of the user and may be changed at will and in arbitrary combinations according to the system herein.

The receiver portion of FIG. 12 is TRIAC-based, like that in FIG. 10, except a larger TRIAC 172 is required to meet the 600 watt drive requirement associated with wallswitch dimmers in the U.S. When driving the full 600 watts, TRIAC 172 dissipates significant heat and the heat-sink requirements of conventional dimmer switches apply.

Wallswitches often are mounted in metal boxes so that antenna 2 is desirably near the front surface and the switchplate (not shown) is desirably plastic or ceramic. Transmit antenna 206 is located similarly and may or may not be the same component as antenna 2. Momentary switches 165a and 165b may take a variety of forms. In the embodiment shown in FIG. 6, they are the two ends of rocker switch 21 so that pressing its top portion activates UP switch 165a and pressing its bottom portion activates DOWN switch 165b. Rocker switch 21, unlike an otherwise-equivalent two button embodiment, would normally not allow activating both switches 165a and 165b at once. However, this feature is desired to simplify linking and unlinking when optional transmitter 208 is present, as described in connection with FIG. 6. In that case, rocker switch 21 would be configured mechanically so that both its top and bottom can be pressed at once.

Signal conditioning 164, receiver 166, processor 176, non-volatile memory 178, resistor 170, power supply 168, gate isolation 174, TRIAC 172, and switches 165a and b in FIG. 12 operate as those same components do in the configuration shown in FIG. 10 and are described above. However if transmitter 208 is present, local switches 165a and 165b should be capable of initiating a LINK command and all of Table 1 (button interpretation) commands apply for operating the circuitry shown in FIG. 12 like the remote controller shown in FIGS. 1-3 described above, unlike the buttons of lamp socket assembly 7 (FIG. 10), which cannot generate a LINK command. The receiving software for processor 176 in FIG. 12 operates the same as in FIGS. 9, 10, and 11 according to the flow chart FIG. 8. As discussed in connection with FIG. 6 and unlike miniature remote controller 100, the transmitter of FIG. 12 has no pre-assigned Identification Number. Instead, it assumes the Identification Number of a particular miniature remote control 100 if and when a LINK command is received from that remote controller while switches 165a and 165b are both pressed. Wallswitch 19 uses that Identification Number until it is changed by another remote controller 100 or cancelled by the original one. If wallswitch 19 has no authorized Identification Number at a given time, it will not transmit.

Many existing wallswitch dimmers are wired together in pairs, or more, to control a light fixture from multiple points, such as the top and bottom of a stairway. Only one wallswitch 19 is wired to the light fixture and only that one has the TRIAC 172 and other features of FIG. 12. The others are much simpler. Compatible remote wallswitches are wired into central wallswitch 19 through its input 207 and the existing wiring between them. Buffering and other minor interface components on input 207 are not shown. Wallswitch 19 responds to UP and DOWN switches on remote wallswitches.

All of the above descriptions are intended by way of example only.

We claim:

1. A system comprising:
   an electrical power control unit residing in a light bulb and at least one miniature remote controller;
   the electrical power control unit comprising:
      a radio receiver configured to receive wireless command signals transmitted by the remote controller;
      an electrical interface configured to interface to driver circuitry within the light bulb;
      a processor connected to the radio receiver and to the electrical interface, wherein the processor is configured to evaluate commands contained in received wireless command signals in order to generate control signals that are configured to control light output of the light bulb as a dimmer function and on/off function; and
      a non-volatile memory configured to store up to at least four identification codes, each identification code associated with a corresponding miniature remote controller and contained in commands received from the corresponding miniature remote controller;
      wherein the processor is responsive to, and only to, wireless commands from miniature remote controllers, if any, for which an enabled identification code is present in the non-volatile memory, and said processor is configured to add and to disable identification codes of miniature remote controllers in the non-volatile memory solely in response to wireless command signals received from those miniature remote controllers and without any physical action taken by the user on the light bulb;
   the miniature remote controller comprising:
      a housing having a top surface and a bottom surface;
      said top surface of said housing configured to include at least one but no more than three distinct finger actuation points; and,
      said bottom surface of said housing configured to include an attachment device configured to removably mount the miniature remote controller to a larger object.

2. The system of claim 1, wherein the processor is further configured to acknowledge receipt of the wireless command signal that is configured to link or unlink a miniature remote controller with the power control unit, said processor acknowledging receipt of the wireless command signal by generating a control signal to cause a brief acknowledgment flash of the light bulb.

3. The system of claim 1, wherein the housing of the miniature remote controller does not exceed 1.8 inches in its greatest dimension, thereby being mountable in unobtrusive locations.

4. The system of claim 1, wherein said attachment device on the bottom surface of said housing comprises an adhesive area on said bottom surface.

5. The system of claim 1, wherein the processor is configured to respond to increased radio signal strength of a wireless signal detected by the radio receiver from the remote controller which is indicative of positioning of the remote controller in close physical proximity to the light bulb in order to prevent unintended linking or unlinking between the electrical power control unit and the remote controller.

6. The system of claim 1, wherein the processor is further configured to generate a control signal, upon receipt of a particular wireless command, to cause continuous repetitive flashing of the light bulb to attract attention of an onlooker.

7. The system of claim 6, wherein the processor is configured to synchronize the continuous repetitive flashing of the light bulb with an external AC power source and to remain so synchronized indefinitely, thereby causing multiple such flashing light sources, not otherwise connected, to flash in unison until the flashing is terminated.

8. The system of claim 1, wherein said top surface of the miniature remote controller is substantially the size and proportions of two adult fingertips placed side-by-side.

9. An electrical power control unit residing in a lamp socket assembly, comprising:
   a radio receiver configured to receive wireless command signals transmitted by at least one remote controller;
   driver circuitry within the lamp socket assembly configured to power at least one contact of a socket in the lamp socket assembly and thereby energize a light bulb seated in the socket;
   an electrical interface to the driver circuitry; and
   a processor connected to the radio receiver and to the electrical interface, wherein the processor is configured to evaluate commands contained in received wireless command signals in order to generate control signals that are configured to control power to the socket in the lamp socket assembly as a dimmer function and on/off function.

10. The unit of claim 9, wherein the processor is further configured to acknowledge receipt of a wireless command signal that is configured to link or unlink the remote controller with the power control unit by generating a control signal to cause a brief acknowledgment flash of the light bulb.

11. In combination, the unit of claim 9 and a remote controller, wherein the remote controller is a miniature remote controller comprising:
a housing having a top surface and a bottom surface and not exceeding 1.8 inches in its greatest dimension, thereby being mountable in unobtrusive locations;
said top surface of said housing configured to include at least one but no more than three distinct finger actuation points; and
said bottom surface of said housing configured to include an adhesive area to removably mount the miniature remote controller to a larger object.

12. The unit of claim 9, and further comprising a non-volatile memory configured to store up to at least four identification codes, each identification code associated with a corresponding one of a plurality of remote controllers and contained in commands received from one of a plurality of remote controllers, wherein the processor is responsive to, and only to, wireless commands from miniature remote controllers, if any, for which an enabled identification code is present in the non-volatile memory.

13. The unit of claim 12, wherein the processor is configured to add and to disable identification codes of miniature remote controllers in the non-volatile memory solely in response to wireless command signals received from those miniature remote controllers and without any physical action taken by the user on the lamp socket assembly.

14. The unit of claim 13, wherein the processor is configured to respond to increased radio signal strength of the wireless signal detected by the radio receiver from the remote controller which is indicative of positioning of the remote controller in close physical proximity to the lamp socket assembly in order to prevent unintended linking or unlinking between the electrical power control unit and the remote controller.

15. The unit of claim 9, wherein the processor is further configured to generate a control signal, upon receipt of a particular wireless command, to cause continuous repetitive flashing of the light bulb to attract the attention of an onlooker.

16. The unit of claim 15, wherein the processor is configured to synchronize the continuous repetitive flashing of the light bulb with an external AC power source and to remain so synchronized indefinitely thereby causing multiple such flashing light sources, not otherwise connected, to flash in unison until the flashing is terminated.

17. In combination, the unit of claim 9, and the lamp socket assembly, wherein the lamp socket assembly comprises a local user control mechanism coupled to the processor, and wherein the processor is responsive to commands from a linked remote controller and from the local user control such that both the local user control mechanism and the linked remote controller are always active and have equal precedence over controlling power to the light bulb.

18. The combination of claim 17, wherein the local user control mechanism comprises a first momentary contact and a second momentary contact configured to, upon actuation of either, output a control signal to the processor that causes the processor to supply more or less power to the socket.

19. The combination of claim 17, wherein the local user control mechanism comprises a single spring-loaded control ring completely encircling and coaxial with the socket such that the control ring may be rotated through a limited angle in either direction and then return to its neutral position when released, and wherein the processor is responsive to a position of the control ring.

20. In combination, the unit of claim 9 and a remote controller, wherein the remote controller is a miniature remote controller comprising:
a housing having a top surface and a bottom surface, wherein the top surface is substantially the size and proportions of two adult fingertips placed side-by-side;
said top surface of said housing being configured to include at least one but no more than three distinct finger actuation points; and
said bottom surface of said housing being configured to include an adhesive area to removably mount the miniature remote controller to a larger object.

21. A lamp socket assembly comprising:
a lamp socket;
an outer casing, at least part of which is symmetric with respect to rotation about an axis of the lamp socket;
a single user control in the form of a ring overlying and completely encircling the cylindrically symmetric part of the casing, said ring being at least partially rotatable about the axis in at least one direction; and
electrical circuitry configured to supply electric power to the lamp socket and responsive to user rotation of the control ring to control electric power to the lamp socket.

22. A system comprising:
an electrical power control unit residing in a permanently-mounted wall dimmer switch and at least one miniature remote controller,
the electrical power control unit comprising:
a radio receiver configured to receive wireless command signals transmitted by the miniature remote controller;
driver circuitry within the wall dimmer switch configured to power at least one light source via in-wall wiring;
an electrical interface to the driver circuitry;
a processor connected to the radio receiver and to the electrical interface, wherein the processor is configured to evaluate commands contained in received wireless command signals in order to control the light output of the light source(s) as a dimmer function and on/off function; and
a non-volatile memory configured to store up to at least four identification codes, each identification code associated with a corresponding miniature remote controller and contained in commands received from the corresponding miniature remote controller; wherein the processor is responsive to, and only to, wireless commands from miniature remote controllers, if any, for which an enabled identification code is present in the non-volatile memory, and said processor is configured to add and to disable identification codes of miniature remote controllers in the non-volatile memory solely in response to wireless command signals received from those miniature remote controllers and without any physical action taken by the user on the wall dimmer switch;

the miniature remote controller comprising:
    a housing having a top surface and a bottom surface;
    said top surface of said housing configured to include at least one but no more than three distinct finger actuation points; and,
    said bottom surface of said housing configured to include an attachment device to removably mount the miniature remote controller to a larger object.

23. The system of claim 22, wherein the processor is further configured to acknowledge receipt of the wireless command signal that is configured to link or unlink a miniature remote controller with the power control unit, said processor acknowledging receipt of the wireless command signal by generating a control signal to cause a brief acknowledgment flash of the light source(s).

24. The system of claim 22, wherein the housing of the miniature remote controller does not exceed 1.8 inches in its greatest dimension, thereby being mountable in unobtrusive locations.

25. The system of claim 22, wherein said attachment device on the bottom surface of said housing comprises an adhesive area on said bottom surface.

26. The system of claim 22, wherein the processor is configured to respond to increased radio signal strength of the wireless signal detected by the radio receiver from the remote controller which is indicative of positioning of the remote controller in close physical proximity to the wall dimmer switch in order to prevent unintended linking or unlinking between the electrical power control unit and the remote controller.

27. The system of claim 22, wherein the processor is further configured to generate a control signal, upon receipt of a particular wireless command, to cause continuous repetitive flashing of the light source(s) to attract the attention of an onlooker.

28. The system of claim 22, wherein said top surface of the miniature remote controller is substantially the size and proportions of two adult fingertips placed side-by-side.

29. The system of claim 27, wherein the processor is configured to synchronize the continuous repetitive flashing of the light source(s) with an external AC power source and to remain so synchronized indefinitely, thereby causing multiple such flashing light sources, not otherwise connected, to flash in unison until the flashing is terminated.

30. In combination, the system of claim 22, and the wall dimmer switch, wherein the wall dimmer switch comprises a local user control mechanism coupled to the processor, and wherein the processor is responsive to commands from a linked remote controller and from the local user control such that both the local user control and the linked remote controller are always active and have equal precedence over controlling power to the light source(s).

31. The combination of claim 30, wherein the local user control mechanism comprises a first momentary contact and a second momentary contact configured to, upon actuation of either, output a control signal to the processor to supply more or less power to the light source(s).

32. The system of claim 22, further comprising a transmitter in the wall dimmer switch configured to send radio commands mimicking a miniature remote controller, thereby allowing the wall dimmer switch to control light source(s) in addition to the light source(s) directly wired to it.

33. A system comprising:
    an electrical power control unit residing in an outlet-to-outlet adapter and at least one miniature remote controller;
    the electrical power control unit comprising:
        a radio receiver configured to receive wireless command signals transmitted by a miniature remote controller;
        driver circuitry within the outlet adapter configured to power at least one outlet of the outlet adapter;
        an electrical interface to the driver circuitry;
        a processor connected to the radio receiver and to the electrical interface, wherein the processor is configured to evaluate commands contained in received wireless command signals in order to control electrical power to the outlet; and
        a non-volatile memory configured to store up to at least four identification codes, each identification code associated with a corresponding miniature remote controller and contained in commands received from the corresponding miniature remote controller;
        wherein the processor is responsive to, and only to, wireless commands from miniature remote controllers, if any, for which an enabled identification code is present in the non-volatile memory, and said processor is configured to add and to disable identification codes of miniature remote controllers in the non-volatile memory solely in response to wireless command signals received from those miniature remote controllers and without any physical action taken by the user on the outlet adapter;
    the miniature remote controller comprising:
        a housing having a top surface and a bottom surface;
        said top surface of said housing configured to include at least one but no more than three distinct finger actuation points; and,
        said bottom surface of said housing configured to include an attachment device to removably mount the miniature remote controller to a larger object.

34. The system of claim 33, wherein the housing of the miniature remote controller does not exceed 1.8 inches in its greatest dimension, thereby being mountable in unobtrusive locations.

35. The system of claim 33, wherein said attachment device on the bottom surface of said housing comprises an adhesive area on said bottom surface.

36. The system of claim 33, wherein the processor is configured to respond to increased radio signal strength of the wireless signal detected by the radio receiver from the remote controller which is indicative of positioning of the remote controller in close physical proximity to the outlet adapter in order to prevent unintended linking or unlinking between the electrical power control unit and the remote controller.

37. The system of claim 33, wherein the processor is further configured to generate a control signal, upon receipt of a particular wireless command, to cause continuous repetitive flashing of a light plugged into the outlet adapter to attract the attention of an onlooker.

38. The system of claim 37, wherein the processor is configured to synchronize the continuous repetitive flashing of the light plugged into the outlet adapter with an external AC power source and to remain so synchronized indefinitely, thereby causing multiple such flashing light sources, not otherwise connected, to flash in unison until the flashing is terminated.

39. In combination, the system of claim 33, and the outlet adapter, wherein the outlet adapter comprises a local user control mechanism coupled to the processor, and wherein the processor is responsive to commands from a linked remote controller and from the local user control such that both the local user control and the linked remote controller are always active and have equal precedence over controlling power to the outlet of the outlet adapter.

40. The combination of claim 39, wherein the local user control mechanism comprises a first momentary contact and a second momentary contact configured to, upon actuation of either, output a control signal to the processor to supply power or extinguish power to the outlet.

41. The system of claim 33, wherein said top surface of the miniature remote controller is substantially the size and proportions of two adult fingertips placed side-by-side.

* * * * *